March 8, 1932.   K. YAMAZAKI   1,848,860
ELECTRICAL REGULATING SYSTEM
Filed Feb. 10, 1931
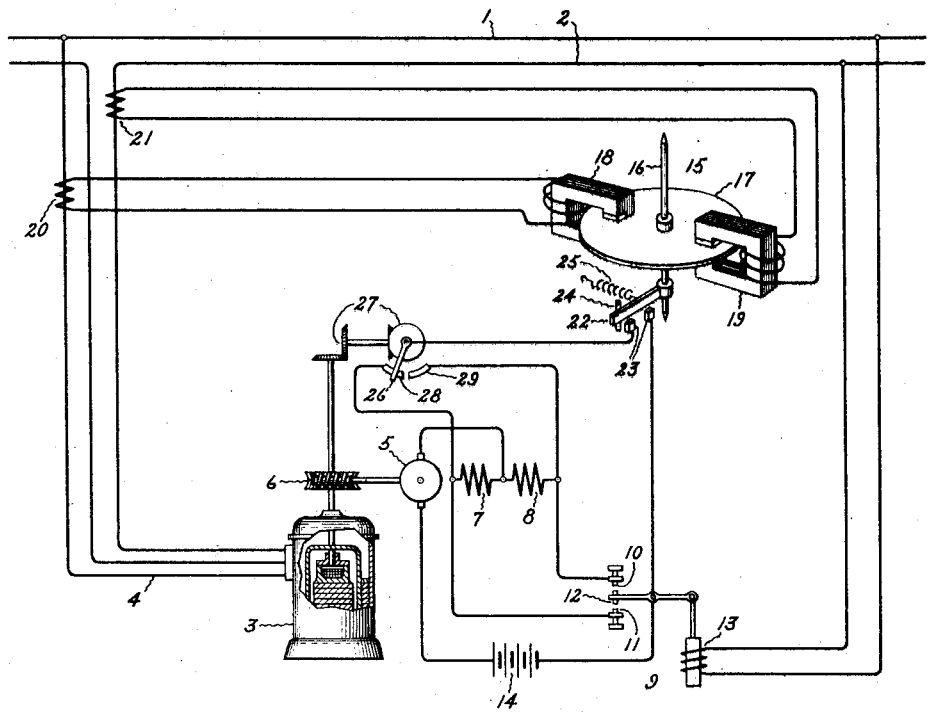
Inventor:
Kunpei Yamazaki,
by Charles E. Mallar
His Attorney.

Patented Mar. 8, 1932

1,848,860

UNITED STATES PATENT OFFICE

KUNPEI YAMAZAKI, OF TOKYOFU, JAPAN, ASSIGNOR TO GENERAL ELECTRIC COMPANY, A CORPORATION OF NEW YORK

ELECTRICAL REGULATING SYSTEM

Application filed February 10, 1931, Serial No. 514,894, and in Japan June 28, 1930.

This invention relates to electrical regulating systems and more particularly to the automatic protection of automatic feeder voltage regulators.

By the term "feeder voltage regulators" I mean to include both induction feeder voltage regulators and feeder voltage regulators which operate on the principle of tap changing. Both of the above types of feeder voltage regulators usually include a reversible pilot motor which operates the regulator in the proper direction to give the necessary voltage buck or boost. These motors are controlled by a voltage responsive device, such as the usual contact making voltmeter.

Both types of feeder voltage regulators are essentially automatic variable ratio transformers and they include a series winding, in which the necessary voltage buck or boost is induced, connected in the circuit whose voltage is to be regulated and a shunt winding, for inducing the requisite voltage buck or boost in the series winding connected across the regulator circuit. In the induction type, control is secured by varying the physical relationship of the two windings, usually by rotating the shunt winding upon its axis, while in the tap changing type of regulator control is secured by varying the voltage impressed on the shunt winding. Both regulators have a neutral or zero buck and boost position. In the induction regulator this is when the shunt and series windings have their axes displaced 90 degrees while in the tap changing type this position is attained when the shunt winding has no voltage impressed on it.

If an internal fault develops in one of these regulators, such as a short circuit or a ground in one of the windings, it is desirable to bring the regulator to its neutral position as quickly as possible for two reasons. The first reason is that it is always desirable to bring a regulator to neutral before it is taken out of service. The second is, that even though the regulator is not taken out of service less damage will be done to a regulator which has developed an internal fault if the regulator is returned to its neutral position.

In accordance with my invention I provide means responsive to an internal fault in a feeder voltage regulator for automatically bringing the regulator to its neutral position upon the development of such a fault.

An object of my invention is to provide a new and improved electrical regulating system.

A further object of my invention is to provide an internal fault responsive protective means for a feeder voltage regulator.

My invention will be better understood from the following description taken in connection with the accompanying drawing and its scope will be pointed out in the appended claims.

Referring now to the single figure of the accompanying drawing, wherein I have shown a preferred embodiment of my invention as applied to an induction voltage regulator, 1 and 2 are the conductors of a single phase feeder circuit and 3 is a single phase induction voltage regulator connected thereto. As shown the regulator is connected in conductor 2 while its shunt winding is connected between conductors 1 and 2 by a conductor 4.

The operating means for regulator 3 is a small pilot motor having an armature 5, which is connected to the regulator through any suitable motion translating means, such as the gearing 6 and reversing series field windings 7 and 8. Control of the pilot motor is secured through a contact-making voltage responsive device 9, having stationary contacts 10 and 11 which are connected respectively to the terminals of field windings 8 and 7. A floating contact 12 of the contact making device is controlled by winding 13 connected across the feeder circuit, so as to be responsive to the voltage thereof. This contact is connected through a suitable source of current supply, such as a battery 14, to one of the terminals of armature 5, the other armature terminal being connected to the common terminal of the field windings 7 and 8. Thus depending upon whether the voltage of the feeder circuit is too low or too high, floating contact 12 will engage either contact 10 or contact 11 to complete an energizing circuit for the operating motor through either field winding 8 or field winding 7, thereby to operate this motor in the proper direction to insert the necessary compensatory voltage buck or boost in the feeder circuit. During normal voltage conditions floating contact 12 is not in engagement with either contact 10 or contact 11 and motor 5 is stationary.

In actual practice it is usually customary to provide the regulator with limit switches which are connected in the control circuit of the operating motor so that upon the attainment of maximum boost or maximum buck one or the other of these switches opens to prevent further operation of the regulator beyond its rated range of operation. For the sake of simplicity, however, this feature has not been shown although it will, of course, be obvious to those skilled in the art that it could be added to the arrangement shown without departing from my invention in its broader aspects.

The internal fault responsive element of my invention is a differential relay having an operating element and a restraining element. No particular type of differential relay is essential, although I prefer to use an induction disc type differential relay and consequently have illustrated such a relay. This relay is illustrated at 15 and comprises a pivotally mounted shaft 16 carrying a disc 17 of conducting material which is acted upon by an operating motor element 18 and a restraining motor element 19. These elements are connected through suitable current transformers 20 and 21 to be responsive respectively to the current in the shunt or exciting winding and the series winding of the regulator. Shaft 16 carries a bridging contact 22 which is arranged to bridge fixed contacts 23. A stop 24 is provided for the bridging contact 22 and a restraining element such as a spring 25 urges contact 22 against this stop. As shown, the motor elements acting on disc 17 are arranged so that operating element 18 urges the relay to circuit closing position while the restraining element 19 urges the relay to circuit opening position.

Associated with the rotatable element of regulator 3 is a circuit controller having a movable contact 26, which is connected to the regulator by any suitable motion transmitting means such as the gearing 27, and a pair of fixed contacts 28 and 29 which are connected respectively to the terminals of field windings 7 and 8. The switch is so arranged that when the regulator is in its neutral position movable contact 26 will be midway between and out of engagement with both of the fixed contacts 28 and 29. As soon as the regulator departs from its neutral position in either direction movable contact 26 engages one or the other of the fixed contacts 28 and 29. Movable contact 26 is connected to the floating contact 12 of the contact making device 9 through the contacts of relay 15. The arrangement of connections is such that whenever contact 26 engages either one of contacts 28 or 29 while movable contact 22 of the relay bridges its fixed contacts 23, the operating motor will be energized so as to return the regulator to its neutral position.

The operation of the illustrated embodiment of my invention is as follows: It has already been explained how the contact making voltage responsive device 9 controls the regulator 3 in response to changes in voltage on the feeder circuit, in a manner to maintain this voltage substantially constant. The operation of the internal fault responsive arrangement will now be described. In any feeder voltage regulator there is a maximum value to the ratio of the current in the exciting winding to the current in the series winding during normal operation. Therefore by making current transformers 20 and 21 of the proper ratios the torque of motor element 19 may be made to predominate over the torque of motor element 18 at all times when this ratio is not exceeded. That is to say at all times when the regulator is in normal condition. However, when this ratio is exceeded, that is, when the current in the exciting winding exceeds by a certain percentage the current in the series winding, the motor element 18 will produce a torque which is stronger than the restraining torque of motor element 19 with the result that contacts 23 of the relay are bridged by contact 22. In this manner a circuit is completed through movable contact 26 and one or the other of its cooperating fixed contacts 28 or 29 to the proper field winding of the operating motor to cause this motor to bring the regulator to neutral position providing it is not already in this position. The purpose of spring 25 is to prevent the operation of the relay at a time when no current flows in the series winding of the regulator.

If an external short-circuit or ground occurs on the feeder circuit, the ratio between the current in the exciting and series windings of the regulator will not change due to the transformer relation in these windings. Consequently relay 15 will not operate.

However, if an internal fault develops in the regulator, such as a short-circuit or ground of either of the windings, the current ratio in these windings will be disturbed and relay 15 will operate. Thus supposing the exciting winding becomes short-circuited, this will not appreciably change the current in the series winding, but there will be a large rush of current through conductor 4 and consequently transformer 20 will produce a large increase in current in the motor element 18 with the result that the relay 15 operates to close its contacts. Similarly suppose that the series winding becomes short-circuited. This will not appreciably increase the current in conductor 2 because the reactance of the series winding is but a small part of the total reactance of the feeder circuit. However, the short-circuit of the series winding is in effect a short-circuit of the exciting winding, due to the transformer relationship of these windings, with the result that a large increase in current takes place through the exciting winding. This, therefore, will also cause relay 15 to close its contacts.

As has already been explained, my invention is equally applicable to tap changing feeder voltage regulators and in fact to any feeder regulator having an operating means, such as a pilot motor, for moving the regulator from a neutral position to either an extreme buck or extreme boost position. I wish also to point out that although I have shown my invention as applied to a single phase regulator, my invention is not so limited, it being equally applicable to a regulator of any desired number of phases without departing from my invention in its broader aspects. With a polyphase regulator there are as many series windings and exciting windings as there are phases. In fact so far as my invention is concerned, a polyphase regulator is merely a plurality of single phase regulators. In order that a polyphase regulator may be brought to its neutral position upon the development of a fault in any one of its windings, it would of course be necessary to have a relay which would close a circuit upon such an occurrence. The most reliable arrangement and the arrangement which I would prefer to use would be to provide as many relays 15 as there are phases, connect the restraining elements of the relays to different series windings and the operating elements of the relays to different exciting windings and connect the contacts of all of the relays in parallel. Thus upon the development of an internal fault in any of the single phase elements of the polyphase regulator, the operating means would be energized to return the regulator to its neutral position.

It will thus be seen that I have provided means responsive to an internal fault in a feeder regulator for returning the regulator to its neutral position upon the development of such a fault.

While I have shown and described a preferred embodiment of my invention, it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States is:

1. In combination, a variable ratio transformer type voltage regulator having a neutral position, and means responsive to an internal fault in said regulator for putting said regulator in its neutral position.

2. In combination, a feeder voltage regulator having a neutral position and two extreme positions, means for moving said regulator from one position to another, and means responsive to an internal fault in said regulator for causing said operating means to put said regulator in its neutral position.

3. In combination, an induction feeder voltage regulator, a reversible motor for operating said regulator, a contact making voltmeter for controlling the operation of said motor, a two element differential relay having its elements connected to be responsive to the current in the series and the shunt windings respectively of said regulator, and a selector switch, the reversible motor being under the joint control of said differential relay and said selector switch.

4. In combination, a variable ratio transformer, means for adjusting the relation of the windings of said transformer to a point where they have no mutual inductance and means operative in accordance with the ratio of the currents in the windings of said transformer for controlling said adjusting means.

5. In combination, a feeder circuit, a feeder regulator connected to said circuit, means responsive to the voltage of said circuit for controlling said regulator, and means responsive to the ratio of the current in the windings of said regulator for controlling said last mentioned means.

6. In combination, an alternating current feeder circuit, an induction voltage regulator connected thereto, a reversible electric motor mechanically connected to said regulator, a circuit controller mechanically connected to said regulator, said circuit controller having a circuit opening position when said regulator is in its neutral position and two different circuit closing positions depending upon whether said regulator is in a buck or boost position, said last mentioned positions controlling a circuit for operating said motor in reverse directions, a source of current, and a relay for completing the operating circuit of said motor through said souce, said relay being connected to close its contacts in response to an internal fault in said regulator.

In witness whereof, I have hereunto set my hand this 19th day of January, 1931.

KUNPEI YAMAZAKI.